(12) United States Patent
Agrawal et al.

(10) Patent No.: US 11,647,444 B2
(45) Date of Patent: May 9, 2023

(54) SPATIAL REUSE IN WIRELESS COMMUNICATION

(71) Applicant: SEMICONDUCTOR COMPONENTS INDUSTRIES, LLC, Phoenix, AZ (US)

(72) Inventors: Abhishek Kumar Agrawal, Fremont, CA (US); Huizhao Wang, San Jose, CA (US); Peiman Amini, Fremont, CA (US); Sigurd Schelstraete, Menlo Park, CA (US); Debashis Dash, Newark, CA (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 17/237,469

(22) Filed: Apr. 22, 2021

(65) Prior Publication Data

US 2021/0345217 A1    Nov. 4, 2021

Related U.S. Application Data

(60) Provisional application No. 63/019,220, filed on May 1, 2020.

(51) Int. Cl.
*H04W 40/12* (2009.01)
*H04B 7/0452* (2017.01)
(Continued)

(52) U.S. Cl.
CPC .......... *H04W 40/12* (2013.01); *H04B 7/0452* (2013.01); *H04L 1/0061* (2013.01);
(Continued)

(58) Field of Classification Search
CPC ... H04W 40/12; H04W 28/06; H04W 72/085; H04W 74/0816; H04W 88/085; H04W 72/0453; H04W 72/0473; H04W 28/0236; H04W 52/242; H04W 84/12; H04B 7/0452; H04L 1/0061; H04L 1/18; H04L 5/0005; H04L 5/0041; H04L 5/0044;
(Continued)

(56) References Cited

U.S. PATENT DOCUMENTS

| 6,301,249 B1* | 10/2001 | Mansfield | ............. H04L 1/1635 714/748 |
| 11,387,973 B2* | 7/2022 | Kim | ................... H04W 72/044 |

(Continued)

OTHER PUBLICATIONS

Edward Au, IEEE 802.11be: Extremely High Throughput, IEEE Vehicular Technology Magazine | Sep. 2019.
(Continued)

*Primary Examiner* — Ajit Patel
*Assistant Examiner* — Wilfred Thomas
(74) *Attorney, Agent, or Firm* — Maschoff Brennan

(57) ABSTRACT

A method of wireless communication may include monitoring, by a first device, a medium for frames in response to preparing to transmit a first frame to a second device. The method may also include while monitoring the medium and before transmitting the first frame, obtaining a second frame transmitted by a third device in the medium and adjusting a transmission of the first frame to the second device in the medium based on obtaining the second frame.

25 Claims, 6 Drawing Sheets

(51) Int. Cl.
| | |
|---|---|
| *H04L 1/00* | (2006.01) |
| *H04L 1/18* | (2006.01) |
| *H04L 5/00* | (2006.01) |
| *H04L 47/34* | (2022.01) |
| *H04W 28/06* | (2009.01) |
| *H04W 74/08* | (2009.01) |
| *H04W 88/08* | (2009.01) |
| *H04W 72/04* | (2009.01) |
| *H04W 72/08* | (2009.01) |
| *H04W 72/0453* | (2023.01) |
| *H04W 72/044* | (2023.01) |

(52) U.S. Cl.
CPC .............. *H04L 1/18* (2013.01); *H04L 5/0005* (2013.01); *H04L 5/0041* (2013.01); *H04L 5/0044* (2013.01); *H04L 5/0053* (2013.01); *H04L 47/34* (2013.01); *H04W 28/06* (2013.01); *H04W 72/085* (2013.01); *H04W 74/0816* (2013.01); *H04W 88/085* (2013.01); *H04W 72/0453* (2013.01); *H04W 72/0473* (2013.01)

(58) Field of Classification Search
CPC ..... H04L 5/0053; H04L 47/34; H04L 1/1854; H04L 5/006; H04L 1/0015
See application file for complete search history.

(56) References Cited

U.S. PATENT DOCUMENTS

| | | | | |
|---|---|---|---|---|
| 2006/0018295 | A1* | 1/2006 | Choi | H04W 64/00 370/338 |
| 2011/0222408 | A1* | 9/2011 | Kasslin | H04W 72/02 370/328 |
| 2011/0286403 | A1* | 11/2011 | Jain | H04W 74/0816 370/329 |
| 2014/0269540 | A1* | 9/2014 | Wang | H04W 72/1215 370/329 |
| 2016/0202344 | A1* | 7/2016 | Sanderovich | H04W 64/00 455/456.1 |
| 2017/0070267 | A1* | 3/2017 | Nabetani | H04B 7/0413 |
| 2018/0084554 | A1* | 3/2018 | Chu | H04L 5/0007 |
| 2019/0089515 | A1* | 3/2019 | Madhavan | H04W 52/24 |
| 2020/0280877 | A1* | 9/2020 | Morioka | H04W 74/002 |
| 2020/0336993 | A1* | 10/2020 | Wang | H04W 52/242 |
| 2021/0391949 | A1* | 12/2021 | Sugaya | H04L 1/1861 |
| 2021/0410183 | A1* | 12/2021 | Fodor | H04B 7/0452 |
| 2022/0116991 | A1* | 4/2022 | Wilhelmsson | H04L 5/0053 |

OTHER PUBLICATIONS

Toni Adame, Time-Sensitive Networking in IEEE 802.11be: On the Way to Low-latency WiFi 7, Department of Information and Communication Technologies, Universitat Pompeu FabraDec. 12, 2019.

* cited by examiner

SPATIAL REUSE IN WIRELESS COMMUNICATION

CROSS-REFERENCE TO RELATED APPLICATION

This patent application claims priority to U.S. Provisional Patent Application No. 63/019,220, filed on May 1, 2020, which is incorporated herein by reference in its entirety.

FIELD

The implementations discussed herein are related to spatial reuse in wireless communication.

BACKGROUND

Unless otherwise indicated in the present disclosure, the materials described in the present disclosure are not prior art to the claims in the present application and are not admitted to be prior art by inclusion in this section.

Wireless communications may occur by transmitting data over frequencies designated for wireless transmission. For example, wireless communications may be transmitted over 2.4 GHz, 5 GHz, 6 GHz, etc. frequencies. In some circumstances, multiple wireless networks may operate in a location using similar frequencies.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

An example method of wireless communication may include monitoring, by a first device, a medium for frames in response to preparing to transmit a first frame to a second device. The method may also include while monitoring the medium and before transmitting the first frame, obtaining a second frame transmitted by a third device in the medium and adjusting a transmission of the first frame to the second device in the medium based on obtaining the second frame.

BRIEF DESCRIPTION OF THE DRAWINGS

Example implementations will be described and explained with additional specificity and detail through the use of the accompanying drawings in which.

DETAILED DESCRIPTION OF SOME EXAMPLE IMPLEMENTATIONS

Figure 1:
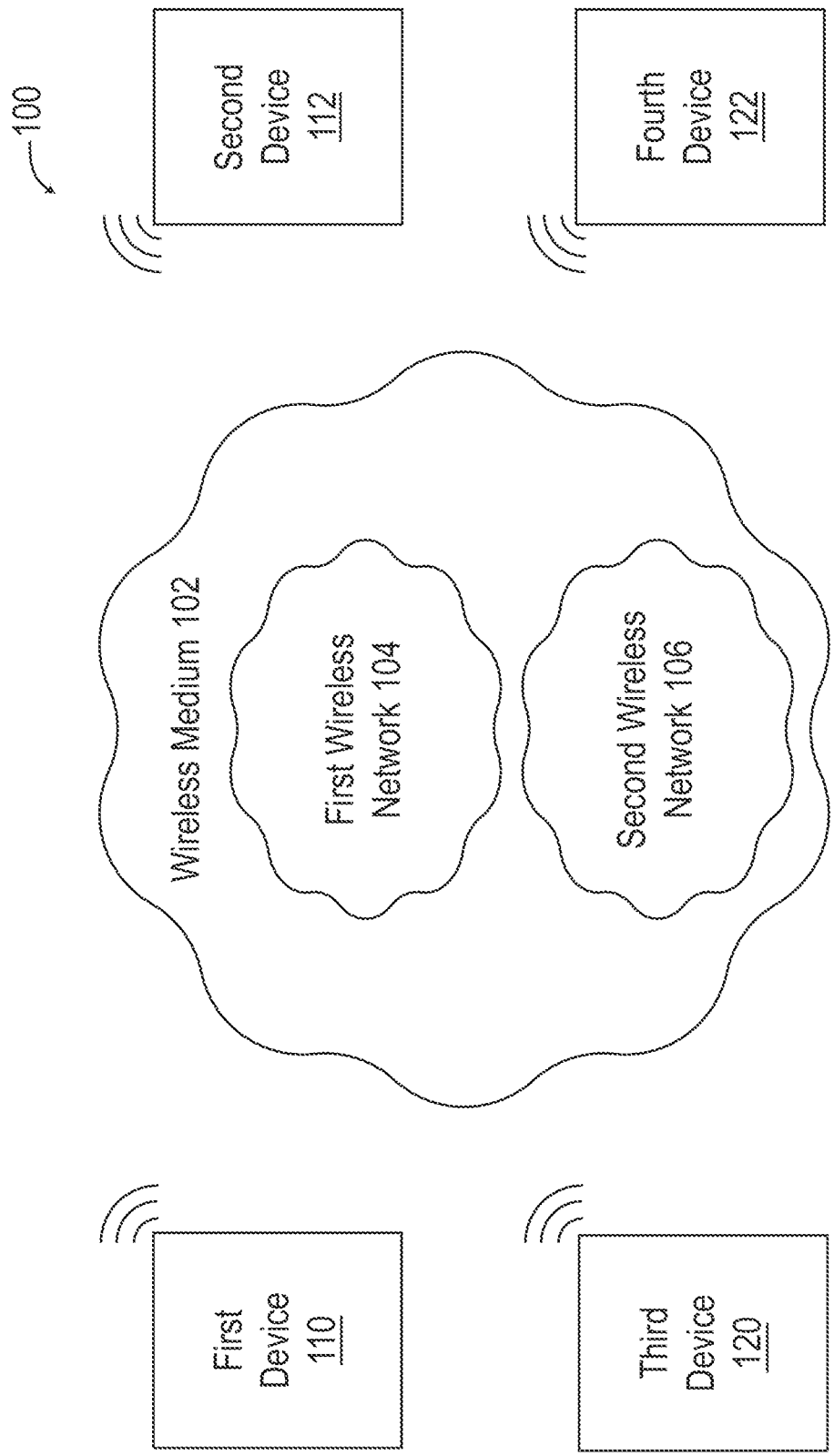
FIG. 1 illustrates an example environment that includes wireless communication.

Implementations described herein may generally relate to wireless communication. In some implementations, wireless communication as described in this disclosure may include various operations that may assist in spatial reuse of a medium. For example, a first wireless network and a second wireless network may be physically located such that transmissions from devices in the first wireless network and devices in the second wireless network may potentially interfere with each other.

In some circumstances, to help reduce and prevent interference with transmission in other wireless networks, a device may follow a particular protocol when transmitting in a medium. The protocol may include sensing the medium before transmission. If the device senses an ongoing transmission, the device may be precluded from transmitting over the medium unless particular conditions are met. For example, the device may transmit over the medium even when the device senses an ongoing transmission in response to the ongoing transmission being of a different wireless network than the device and based on a given power level of the ongoing transmission and/or a power level selected for transmission by the device.

The current protocol may make decisions regarding transmission by the device based on a power level of the ongoing transmission. The current protocol may not consider how a receiving device that is receiving the ongoing transmission may be affected by the transmission by the device.

In some implementations, wireless communication as described in this disclosure may include various operations that may consider how a transmission by a device may affect a receiving device of an ongoing transmission. For example, a first wireless network using a medium may include a first device and a second device. A second wireless network using the medium may include a third device and a fourth device. The first device may begin a protocol to transmit a data frame to the second device by sending a management frame to the second device. In response to receiving the management frame, the second device may transmit a response frame to the first device. After obtaining the response, the first device may send the data frame to the second device using the first network.

As the first device sends the transmission of the management frame using the medium, the third device of the second network may be monitoring the medium in response to preparing to transmit a second data frame to the fourth device using the second wireless network. In response to monitoring the medium, the third device may obtain, that is intercept, the management frame from the first device and the response frame from the second device. In response to intercepting the management frame, the third device may adjust a transmission protocol for sending the second data frame to the fourth device. For example, as an adjustment to the transmission protocol and, using the response frame, the third device may obtain information regarding a path loss between the third device of the second wireless network and the second device of the first wireless network. Based on the path loss, the third device may determine how transmission of the second data frame in the second wireless network may potentially interfere with the second device in the first wireless network. Based on the potential interference, the third device may adjust parameters for transmission of the second data frame to the fourth device in the second wireless network.

The present disclosure may include hardware and/or software, or a combination thereof, configured to reduce potential interference by adjusting a transmission protocol in view of an expected impact to an intended receiver of a transmission.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example environment 100 that includes wireless data transmission, in accordance with one or more implementations of the present disclosure. The environment 100 may include a wireless medium 102, a first wireless network 104, a second wireless network 106, a first device 110, a second device 112, a third device 120, and a fourth device 122.

The wireless medium 102 may include any range of frequencies. For example, the wireless medium 102 may include a frequency band such as one of the 900 MHz, 2.4 GHz, 3.6 GHz, 5.0 GHz, 6 GHz, 60 GHz frequency band, or other frequency bands. Alternately or additionally, the wireless medium 102 may include one or more channels within a frequency band.

The first wireless network 104 and the second wireless network 106 may be wireless networks that use the wireless medium 102 for transmission of frames. For example, the first wireless network 104 and the second wireless network 106 may be configured to operate in the 2.4 GHz frequency band, the 5.0 GHz frequency band, or the 6.0 GHz frequency band. The first wireless network 104 and the second wireless network 106 may be implemented using any of the 802.11 protocols or other suitable wireless standards or protocols.

Each of the first device 110, the second device 112, the third device 120, and the fourth device 122 may be configured to transmit and receive wireless communications. In some implementations, each of the first device 110, the second device 112, the third device 120, and the fourth device 122 may be any electronic or digital device that is configured to transmit and receive wireless communications.

In these and other implementations, each of the first device 110, the second device 112, the third device 120, and the fourth device 122 may be configured as a device that may assist in maintaining a wireless local area network (WLAN), such as one of the first wireless network 104 or the second wireless network 106.

For example, each of the first device 110, the second device 112, the third device 120, and the fourth device 122 may include a gateway, a repeater, a mesh node, or any other suitable device configured to host or control access to a WLAN. Alternately or additionally, each of the first device 110, the second device 112, the third device 120, and the fourth device 122 may be configured as a client device that may be configured to access a WLAN. For example, each of the first device 110, the second device 112, the third device 120, and the fourth device 122 may include a desktop computer, a laptop computer, a smartphone, a mobile phone, a tablet computer, a vehicle, a repeater, a speaker, a smart device, an appliance, or any other electronic device that may be configured to transmit and/or receive wireless communications in a WLAN.

In some implementations, the first device 110 and the second device 112 may be included as part of the first wireless network 104. As such, the first device 110 and the second device 112 may use the first wireless network 104 and the wireless medium 102 for wireless communication. The third device 120 and the fourth device 122 may be included as part of the second wireless network 106. As such, the third device 120 and the fourth device 122 may use the second wireless network 106 and the wireless medium 102 for wireless communication.

In some implementations, the first wireless network 104 and the second wireless network 106 may be operating using the same frequency band and/or one or more channels within the same frequency band. In these and other implementations, the first wireless network 104 and the second wireless network 106 may be located such that wireless traffic of the first wireless network 104 and wireless traffic of the second wireless network 106 may interfere with each other.

In some implementations, each of the first device 110, the second device 112, the third device 120, and the fourth device 122 when configured as client devices may be configured to adhere to an interference reduction protocol to help to reduce and/or avoid interference between wireless traffic of the first wireless network 104 and wireless traffic of the second wireless network 106. A description of the interference reduction protocol is now provided with respect to the first device 110 initiating a first transmission. The description would be applicable to any of the first device 110, the second device 112, the third device 120, and the fourth device 122 when configured as a client device and initiating a transmission.

For example, the first device 110 may obtain a data frame to transmit to another device within the first wireless network 104, such as the second device 112. In response to obtaining the data frame to transmit, the first device 110 may monitor the wireless medium 102 for a particular time period. The time period may be randomly selected by the first device 110.

In some implementations, in response to not obtaining an indication of transmission of frames in the wireless medium 102 during the time period, a first procedure of the interference reduction protocol may be followed. Alternately or additionally, in response to obtaining an indication of transmission of frames in the wireless medium 102 during the time period in the second wireless network 106, that is a wireless network of which the first device 110 is not a part, a second procedure of the interference reduction protocol may be followed. Alternately or additionally, in response to obtaining an indication of transmission of frames in the wireless medium 102 during the time period in the first wireless network 104, that is the wireless network of which the first device 110 is a part, a third procedure of the interference reduction protocol may be followed.

In some implementations, in the first procedure, the first device 110 may send a management frame of the interference reduction protocol to the second device 112. In response to the management frame, the second device 112 may send a response frame to the first device 110. In response to obtaining the response frame, the first device 110 may transmit the data frame to the second device 112.

In some implementations, the second procedure may be followed in response to the first device 110 obtaining an indication of transmission of frames in the wireless medium 102 over the second wireless network 106 during the time period. In these and other implementations, the indication of transmission of frames in the wireless medium 102 may include the first device 110 obtaining a management frame. The management frame may have been transmitted by a device of the second wireless network 106 using the wireless medium 102, such as the third device 120. In response to obtaining the management frame, the first device 110 may monitor the medium 102 for the response frame from another device of the second wireless network 106, such as the fourth device 122. Using the response frame, the first device 110 may determine potential interference that may occur at the fourth device 122 in the second wireless network 106 by transmission of the data frame from the first device 110 to the second device 112 over the first wireless network 104. Based on the potential interference, the first device 110 may adjust the transmission of the data frame from the first device 110 to the second device 112 over the first wireless network 104. The adjustment of the transmission of the data frame may include delaying transmission, adjusting a power level of the transmission, and/or adjusting a frequency segment of the wireless medium 102 used for transmission of the data frame.

In some implementations, the third procedure may be followed in response to the first device 110 obtaining an indication of transmission of frames in the wireless medium 102 over first wireless network 104 during the time period. In these and other implementations, the first device 110 may wait to transmit the data frame to the second device 112. In response to the first device 110 determining to wait to transmit the data frame to the second device 112, the first device 110 may obtain another random time period during which to monitor the wireless medium 102. The first device 110 may again follow the interference reduction protocol during the random time period.

An example of the first procedure of the interference reduction protocol is now provided with respect to the first device 110. As explained above, the first procedure may occur in response to the first device 110 not obtaining an indication of transmission of frames in the wireless medium 102 during a time period when the first device 110 waits to transmit a data frame.

During the first procedure, in response to not obtaining an indication of transmission of frames in the medium during the time period, the first device 110 may construct the management frame for transmission to the second device 112 before transmission of the data frame. The management frame may include multiple types of information. For example, the management frame may include an identifier that identifies the management frame as a management frame of the interference reduction protocol. Alternately or additionally, the management frame may include an identifier of the first device 110 and an identifier of the second device 112 based on the second device 112 being configured to receive the data frame to be transmitted. The management frame may further include information regarding the data frame, such as a type of the data frame; configuration parameters for transmission of the data frame, such as power levels; modulation schemes; frequency segment for use in transmission; and duration of transmission, among other types of information.

The first device 110 may transmit the management frame to the second device 112 over the first wireless network 104 using the wireless medium 102. The second device 112 may obtain the management frame from the first device 110. In response to receiving the management frame and based on the interference reduction protocol, the second device 112 may construct a response frame. The response frame may include multiple types of information. For example, the response frame may include an identifier that identifies the response frame as a response frame of the interference reduction protocol. Alternately or additionally, the response frame may include other information such as a transmit power for the response frame. The second device 112 may transmit the response frame to the first device 110 over the first wireless network 104 using the wireless medium 102. In response to obtaining the response frame, the first device 110 may transmit the data frame to the second device 112 over the first wireless network 104 using the wireless medium 102.

An example of the second procedure of the interference reduction protocol is now provided with respect to the first device 110. As explained above, the second procedure may occur in response to the first device 110 obtaining an indication of transmission of frames in the wireless medium 102 over the second wireless network 106 during a time period when the first device 110 waits to transmit a data frame over the first wireless network 104.

During the second procedure, the first device 110 while monitoring the wireless medium 102 may obtain a management frame transmitted over the second wireless network 106 using the wireless medium 102. For example, the third device 120 may transmit the management frame to the fourth device 122 over the second wireless network 106 using the wireless medium 102. In response to obtaining the management frame, the first device 110 may identify the fourth device 122 as being a receiving device for a data frame to be transmitted by the third device 120. In these and other implementations, the first device 110 may wait for the response frame from fourth device 122.

In some implementations, in response to not obtaining the response frame, the first device 110 may transmit the data frame to the second device 112. In these and other implementations, not obtaining the response frame may indicate that the fourth device 122 is located in a position such that the transmission of the data frame to the second device 112 over the first wireless network 104 may not interfere with the fourth device 122 receiving a data frame from the third device 120 over the second wireless network 106. Alternately or additionally, not obtaining the response frame may indicate that the fourth device 122 did not transmit the response frame and as such the fourth device 122 may not receive a data frame from the third device 120.

In some implementations, the first device 110 may obtain a response frame without obtaining a management frame. For example, the third device 120 may transmit a management frame to the fourth device 122 which may not be received by the first device 110. In response to the management frame, the fourth device 122 may transmit a response frame that is received by the first device 110. In response to obtaining the response frame and not the management frame, the first device 110 may wait to transmit the data frame to the second device 112.

In some implementations, in response to obtaining the management frame and the response frame, the first device 110 may determine potential interference at the fourth device 122 from transmission of the data frame to the second device 112. The first device 110 may determine the potential interference based on information in the response frame. For example, the first device 110 may use the transmit power of the response frame as included in the response frame to determine the potential interference. For example, the first device 110 may measure a received power at which the first device 110 receives the response frame. Using the received power and the transmit power, the first device 110 may calculate a path loss between the first device 110 and the fourth device 122.

In some implementations, the first device 110 may adjust the transmission of the data frame to the second device 112 based on the path loss. For example, in response to the path loss not satisfying a first threshold (for example by being less than the first threshold), the first device 110 may determine that the fourth device 122 is positioned such that transmission of the data frame to the second device 112 may interfere with the fourth device 122. In response to the transmission of the data frame to the second device 112 potentially interfering with the fourth device 122, the first device 110 may wait to transmit the data frame to the second device 112. For example, the fourth device 122 may be positioned close to the first device 110 such that any transmission by the first device 110 may interfere with the fourth device 122 receiving a transmission.

In these and other implementations, the first threshold may be based on information from the management frame among other information, such as information from the protocol used to implement that second wireless network 106. For example, the first threshold may be calculated based on a minimum power level for the first device 110 to transmit to the second device 112 and a maximum acceptable interference power level at the fourth device 122. For example, the first threshold may be based on a difference between the minimum power level and the maximum acceptable interference power level. In some implementations, the maximum acceptable interference power level may be −82 dB or some other value.

In response to the first device 110 determining to wait to transmit the data frame to the second device 112, the first device 110 may obtain another random time period during which to monitor the wireless medium 102. The first device 110 may again follow the interference reduction protocol.

In some implementations, in response to the path loss satisfying the first threshold (for example by being more than the first threshold), the first device 110 may adjust a transmission power at which the data frame is transmitted to the second device 112. An amount of the adjustment of the transmission power may be based on the path loss. For example, the transmission power may be reduced until the power level of the data frame when received at the fourth device 122 satisfies a second threshold. The second threshold may be based on information from the management frame among other information, such as information from the protocol used to implement that second wireless network 106. For example, the first device 110 may reduce the transmission power such that with the path loss, the power level of the data frame when received at the fourth device 122 is at or below the maximum acceptable interference power level for the fourth device 122.

In some implementations, the first device 110 may determine based on the path loss satisfying the second threshold that no adjustment of the transmission power is necessary. As such, the first device 110 may transmit the data frame without regard to interference that may occur at the fourth device 122.

In some implementations, in response to the path loss satisfying the first threshold, the first device 110 may adjust a frequency segment for transmission of the data frame to the second device 112. In these and other implementations, the first device 110 may obtain, from the management frame, an indication of the frequency segment that may be used for transmission of the data frame from the third device 120 to the fourth device 122. In these and other implementations, the first device 110 may adjust the frequency segment used to send the data frame to the second device 112 based on the frequency segments from the management frame. For example, the first device 110 may select a frequency segment of the wireless medium 102 not being used by the third device 120.

The first device 110 may be configured to begin transmission of the data frame within a time window of receiving the response frame. The time window may start after receiving the response frame. The duration of the time window may be based on a duration of the data frame transmitted by the third device 120 to the fourth device 122. For example, the duration of the time window may be such that transmission of the data frame begins during transmission of the data frame to the fourth device 122. Alternately or additionally, the time window may end before the end of transmission of the data frame to the fourth device 122.

In some implementations as discussed above, the interference reduction protocol may be implemented by a client device when transmitting data frames based on a management frame transmitted by another client device. Alternately or additionally, the interference reduction protocol may be implemented by a client device in a first wireless network in response to a transmission from an access point to one or more client devices in a second wireless network. For example, the first device 110 may be a client device in the first wireless network 104 and the third device 120 may be an access point in the second wireless network 106. In these and other implementations, the third device 120 may send a trigger frame to the fourth device 122 and other devices in the second wireless network 106 to request data frames from the fourth device 122 and the other devices in the second wireless network 106. In these and other implementations, the first device 110 may obtain the trigger frame.

In some implementations, the trigger frame may be used as a management frame in the interference reduction protocol. In these and other implementations, the trigger frame may include a frequency segment for each of the client devices in the second wireless network 106 to transmit data frames to the third device 120. In response to the trigger frames, the client devices in the second wireless network 106 may send response frames to the third device 120. The response frames may be used as response frames. The first device 110 may determine a path loss between the first device 110 and each of the client devices in the second wireless network 106 based on the response frames. The first device 110 may adjust transmission parameters based on the path loss between the first device 110 and each of the client devices in the second wireless network 106. For example, the first device 110 may adjust a frequency segment and/or transmission power for transmitting the data frame to the second device 112.

In some implementations, the interference reduction protocol may be adjusted based on locations of devices being known to other devices. For example, with a known location, a path loss between two devices may be known without information obtained from the response frame. As a result, the response frame may not be considered by a device. For example, the first device 110 may be monitoring the wireless medium 102 in preparation to transmit a first data frame. The first device 110 may obtain a management frame from the third device 120 indicating transmission to the fourth device 122. The first device 110 may know a location of the fourth device 122 and/or a path loss between the first device 110 and the fourth device 122. Based on this known location and/or path loss, the first device 110 may adjust the transmission of the first data frame if necessary and transmit the first data frame without receiving and/or considering the response frame from the fourth device 122.

In some implementations, the location and/or path loss between the first device 110 and the fourth device 122 may be known to the first device 110 based on the fourth device 122 being a static device and the first device 110 previously determining the location and/or path loss. Alternately or additionally, the first device 110 may obtain the location and/or the path loss through communication directly with the fourth device 122 or through some other means.

In some implementations, the first device 110 may communicate to the third device 120 that the first device 110 is aware of the location and/or path loss with respect to the fourth device 122. In response to obtaining this information, the third device 120 may not send the management frame before transmitting to the fourth device 122. In these and other implementations, the first device 110 when transmitting a data frame to the second device 112 may adjust parameters of transmission, if necessary, to avoid interference with the fourth device 122. Alternately or additionally, the first device 110 may monitor the wireless medium 102 and in response to detecting a transmission to the fourth device 122, may adjust the parameters of transmission, if necessary, to avoid interference with the fourth device 122.

In some implementations, the interference reduction protocol may include additional procedures. For example, the first device 110 may be preparing to transmit to the second device 112 and may determine that the third device 120 has transmitted a management frame. In these and other implementations, the second device 112 may obtain the management frame. The second device 112 may calculate a path loss between the third device 120 and the second device 112. The second device 112 may send a second response frame to devices in the first wireless network 104 regarding how the transmission by the third device 120 may affect the second device 112. The first device 110 may obtain the second response frame from the second device 112. Based on the second response frame, the first device 110 may determine that the interference at the second device 112, caused by the transmission to the fourth device 122, may be such that the transmission from the first device 110 to the second device 112 may not be correctly received at the second device 112. As such, the first device 110 may wait to transmit the data frame to the second device 112. For example, based on the second response frame, the first device 110 may determine that a first power level may be used to transmit a first frame to the second device 112 such that the second device 112 may obtain the first frame while the third device 120 is transmitting to the fourth device 122. Alternately or additionally, based on the response frame from the fourth device 122, the first device 110 may determine a second power that may be used to avoid the transmission by the first device 110 interfering with the fourth device 122. In response to the second power level being less than the first power level, the first device 110 may wait to transmit the first frame to the second device 112.

Modifications, additions, or omissions may be made to the environment 100 without departing from the scope of the present disclosure. For example, the environment 100 may include any number of other devices or wireless networks.

Figure 2:
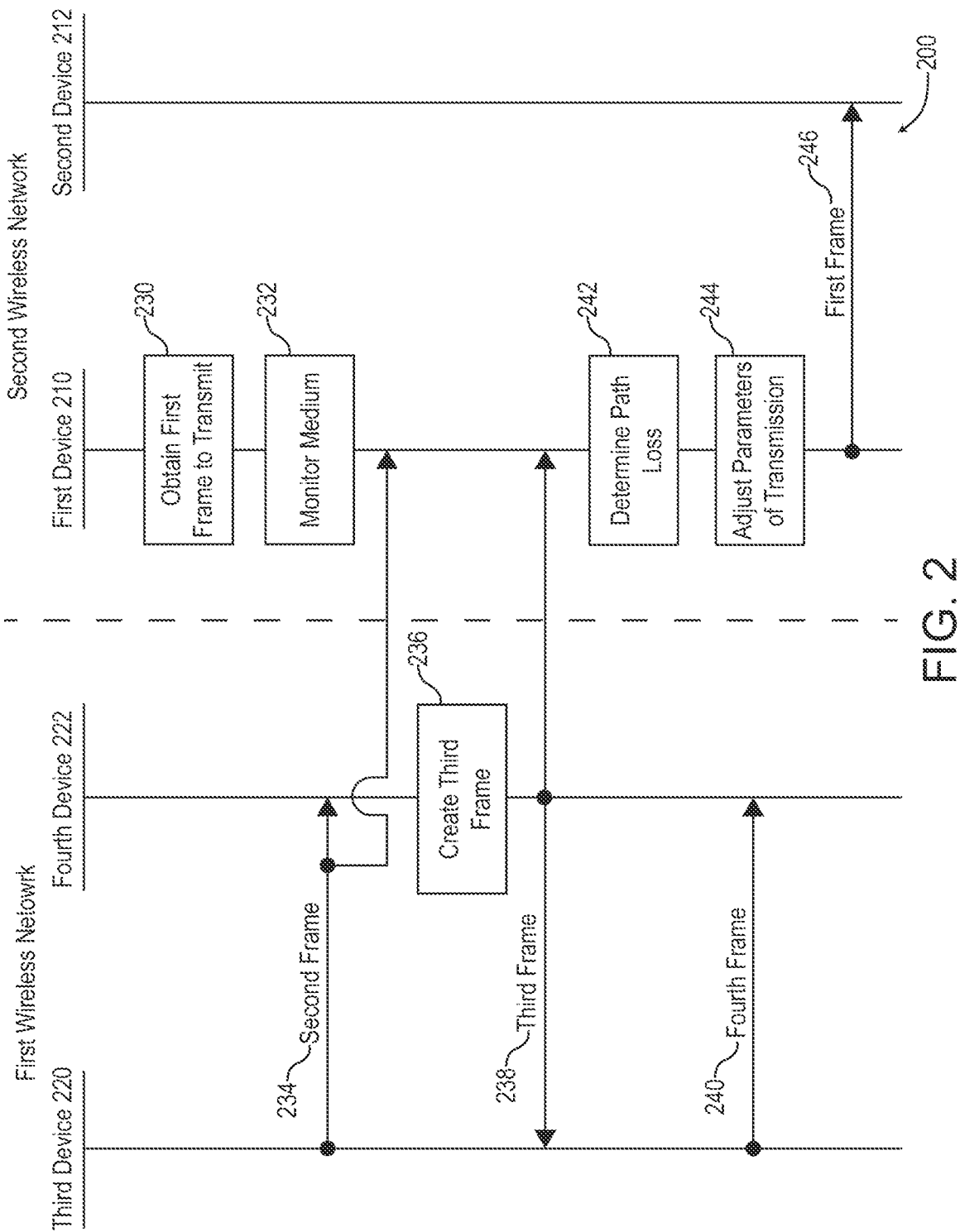
FIG. 2 illustrates example operations for spatial reuse in wireless communication.

FIG. 2 illustrates example operations 200 for spatial reuse in wireless communication. The operations 200 may be arranged in accordance with at least one implementation described in the present disclosure. The operations 200 may be between a first device 210, a second device 212, a third device 220, and a fourth device 222.

In some implementations, the first device 210, the second device 212, the third device 220, and the fourth device 222 may be analogous to the first device 110, the second device 112, the third device 120, and the fourth device 122 of FIG. 1, respectively. Accordingly, no further explanation is provided with respect thereto. Alternatively or additionally, the operations 200 may be an example of the operation of the elements of the environment of FIG. 1.

In some implementations, the operations 200 may be an example of communications and interactions between the first device 210, the second device 212, the third device 220, and the fourth device 222. The operations 200 illustrated are not exhaustive but are merely representative of operations 200 that may occur. Furthermore, one operation as illustrated may represent one or more communications, operations, and/or data exchanges.

Generally, the operations 200 may relate to spatial reuse in a wireless communication. The interactions between the first device 210, the second device 212, the third device 220, and the fourth device 222 may occur over a wireless medium with respect to two wireless networks. For example, the first device 210 and the second device 212 may be part of a second wireless network using the wireless medium. In this example, the third device 220 and the fourth device 222 may be part of a first wireless network using the wireless medium. In some implementations, the first device 210 and the third device 220 may be configured as client devices.

At operation 230, the first device 210 may obtain a first frame to transmit to the second device 212 over the second wireless network. For example, the first device 210 may obtain the first frame from an application running on the first device 210. In response to obtaining the first frame to transmit, the first device 210 may obtain a random amount of time to monitor the medium. The random amount of time may be generated by the first device 210.

At operation 232, the first device 210 may monitor the medium for the random amount of time. Before the first device 210 began monitoring the medium, the third device 220 may have obtained a fourth frame (not illustrated) to transmit to the fourth device 222 over the first wireless network. For example, the third device 220 may obtain the fourth frame from an application running on the third device 220.

At operation 234, the third device 220 may transmit a second frame to the fourth device 222 over the first wireless network using the medium. The second frame may be a management frame in an interference reduction protocol. In these and other implementations, the third device 220 may have obtained the fourth frame and started a random timer. During the random timer, the third device 220 may have monitored the medium. In response to expiration of the random timer and not sensing any frame transmission on the medium during the monitoring, the third device 220 may transmit the second frame. The third device 220 may transmit the second frame with the fourth device 222 as the intended receiver of the second frame. The fourth device 222 may obtain the second frame. The first device 210 while monitoring the medium may also receive the second frame. For example, the first device 210, being part of the second wireless network, may intercept the second frame that is intended for the fourth device 222. As part of intercepting the second frame, the first device 210 may adjust the transmission protocol of the first frame as described with respect to FIG. 2. For example, instead of transmitting the first frame at the end of the random amount of time, the first device 210 may monitor for a third frame 230 and perform other operations as described with respect to FIG. 2.

At operation 236, the fourth device 222 may create a third frame. The third frame may be a response frame in the interference reduction protocol. The fourth device 222 may create the third frame in response to obtaining the second frame from the third device 220. The first device 210, in response to obtaining the second frame, may continue to monitor the medium to obtain the third frame transmitted by the fourth device 222.

At operation 238, the fourth device 222 may transmit the third frame to the third device 220 over the first wireless network using the medium. The third device 220 may obtain the third frame from the fourth device 222. The first device 210 may be monitoring the medium and may obtain the third frame from the fourth device 222.

At operation 240, the third device 220 may transmit the fourth frame to the fourth device 222 over the first wireless network using the medium. The third device 220 may transmit the fourth frame to the fourth device 222 in response to obtaining the third frame from the fourth device 222.

At operation 242, the first device 210 may determine a path loss between the first device 210 and the fourth device 222 based on the third frame obtained from the fourth device 222. In some implementations, the first device 210 may determine the path loss based on a received power level of the third frame determined by the first device 210 and a transmit power level of the third frame as included in the third frame by the fourth device 222.

At operation 244, the first device 210 may determine to adjust a parameter of the transmission of the first frame to the second device 212 based on the path loss between the first device 210 and the fourth device 222. In these and other implementations, the parameter may be a time for transmission of the first frame. For example, in response to the path loss not satisfying a first threshold, such that the path loss is too small between the fourth device 222 and the first device 210, the first device 210 may determine to delay transmission of the first frame to avoid interfering with the fourth device 222 receiving the fourth frame from the third device 220.

Alternately or additionally, the parameter may be a power level of transmission of the first frame. In these and other implementations, the power level of transmission may be adjusted, for example reduced, such that a power level of the first frame when received at the fourth device 222 satisfies a second threshold. The second threshold may be a maximum acceptable interference power level for the fourth device 222.

Alternately or additionally, the parameter may be a frequency segment for transmission of the first frame. In these and other implementations, the first device 210 may obtain an indication of frequency segments used for transmission of the fourth frame from the second frame. The first device 210 may select a frequency segment for transmission to the second device 212 that is different from the frequency segments being used by the fourth frame.

At operation 246, the first device 210 may transmit the first frame to the second device 212 over the second wireless network using the medium. The first frame may be transmitted using the parameters adjusted in operation 244. In these and other implementations, the first frame may be transmitted within a window of time after receiving the third frame. The window of time may be based on transmission time for the fourth frame.

Modifications, additions, or omissions may be made to the operations 200 without departing from the scope of the present disclosure. For example, in some implementations, the operations 200 may include one or more additional operations. For example, the operations 200 may include an operation of the third device 220 monitoring the medium.

As another example, in some implementations, the operations 200 may be arranged in a different order. For example, the operations 242 and 244 may occur before the operation 240. Alternatively or additionally, in some implementations, one or more of the operations 200 may not be included. For example, the operations of 242 and 244 may not be included. In these and other implementations, the first device 210 may not obtain the third frame from the fourth device 222. In response to not obtaining the third frame, the first device 210 may transmit the first frame in operation 246 without performing operations 242 and 244. As another example, the operation 244 may not be included. In these and other implementations, the first device 210 may determine based on the path loss that the parameters of transmission may not be adjusted. For example, the path loss between the first device 210 and the fourth device 222 may be such that transmission of the first frame may not interfere with the fourth device 222.

Figure 3:
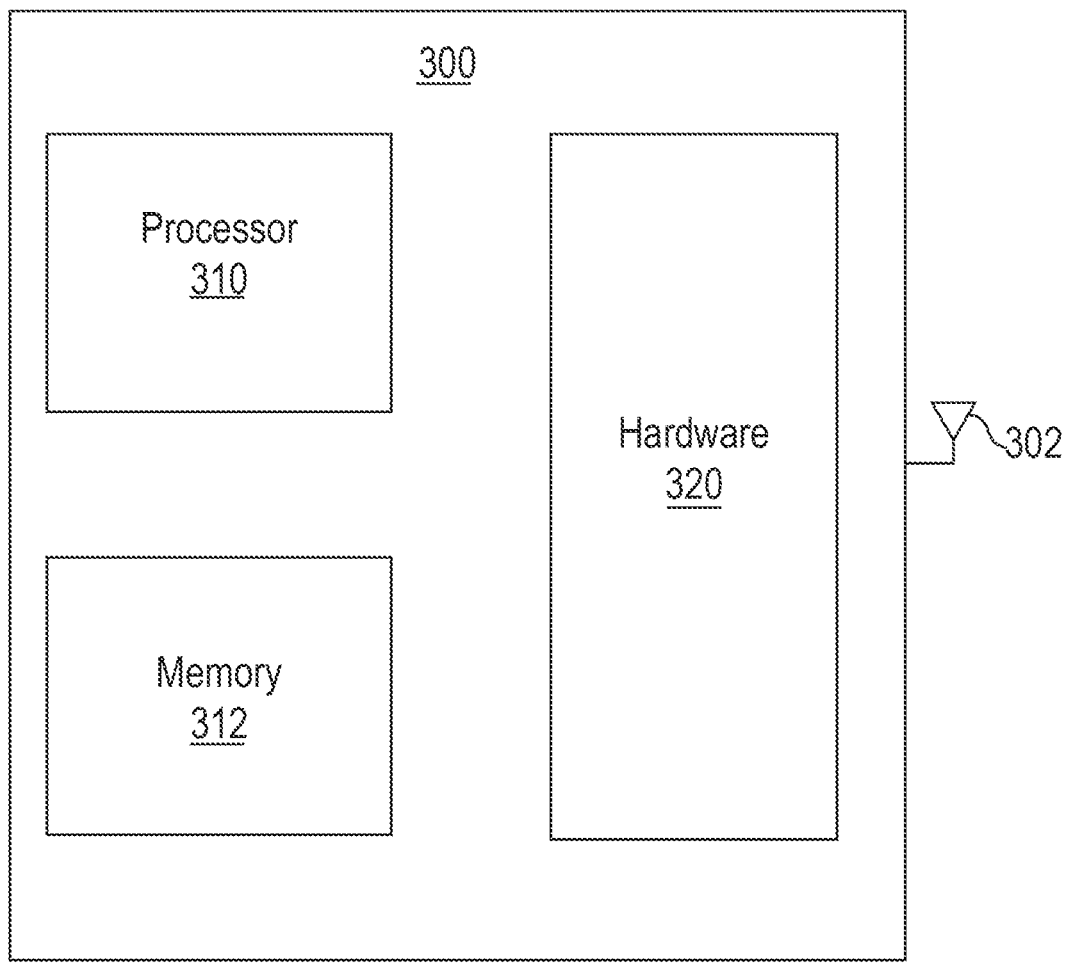
FIG. 3 illustrates an example device configured for wireless communication.

FIG. 3 illustrates an example device 300 configured for wireless communication, in accordance with one or more implementations of the present disclosure. The device 300 may be an example implementation of one of the devices of FIG. 1. The device 300 may include an antenna element 302, a processor 310, memory 312, and hardware 320.

In some implementations, the hardware 320 may be part of a datalink layer and/or physical layer of networking layers of the device 300. The hardware 320 may be configured to encode transmit signals with data frames using a baseband frequency. The hardware 320 may further include a conversion circuit configured to shift the transmit signals from the baseband frequency to different frequency segments based on a selected frequency segment. The hardware 320 may further be configured to adjust a power of transmission of the transmit signal. The hardware 320 may provide the transmit signal to the antenna element 302 for transmission.

The hardware 320 may be further configured to obtain receive signals from the antenna elements 302. The conversion circuit of the front-end circuit 330 may be configured to shift the receive signals to the baseband frequency and to detect a power level of the receive signals as received by the device 300. The hardware 320 may also be configured to decode the obtained receive signals at the baseband frequency to obtain data frames.

In some implementations, the processor 310 may be part of a network layer or other networking layers of the device 300. Alternately or additionally, the processor 310 may be part of the datalink layer of the device 300.

In some implementations, the processor 310 may be configured to provide data frames to the hardware 320 for transmission. The processor 310 may also obtain data frames from the hardware 320 for further processing. For example, the processor 310 may analyze the data frames to extract information from the data frames, such as a transmit power level of a data frame.

In some implementations, the processor 310 may be configured to perform operations described in this disclosure with respect to an interference reduction protocol. For example, the processor 310 may be configured to construct management frames and/or response frames. Alternately or additionally, the processor 310 may also be configured to direct the hardware 320 to monitor a medium for frames, such as the management frame and/or response frame. Alternately or additionally, the processor 310 may be configured to determine a path loss between the device 300 and other devices. In these and other implementations, based on the path loss, the processor 310 may determine adjustments for parameters for transmission of frames. The processor 310 may direct the hardware 320 to adjust the parameters of a data frame for transmission of the data frame.

In some implementations, the memory 312 may be coupled to the processor 310 and may be configured to store instructions for performing one or more operations of an interference reduction protocol. The processor 310 may execute the instructions stored in the memory 312 to perform the operations.

Figure 6:
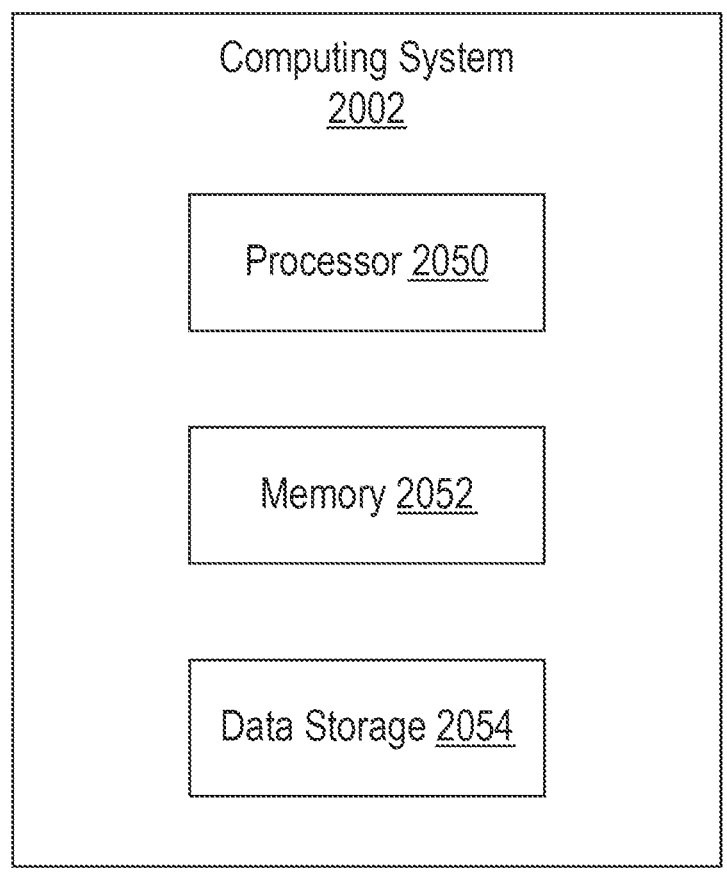
FIG. 6 illustrates a block diagram of an example computing system that may be used to perform or direct performance of one or more operations described according to at least one implementation of the present disclosure.

An example of the processor 310 may include the processor 2050 of FIG. 6. An example of the memory 312 may include the memory 2052 and/or the data storage 2054 of FIG. 6. Modifications, additions, or omissions may be made to the device 300 without departing from the scope of the present disclosure.

Figure 4:
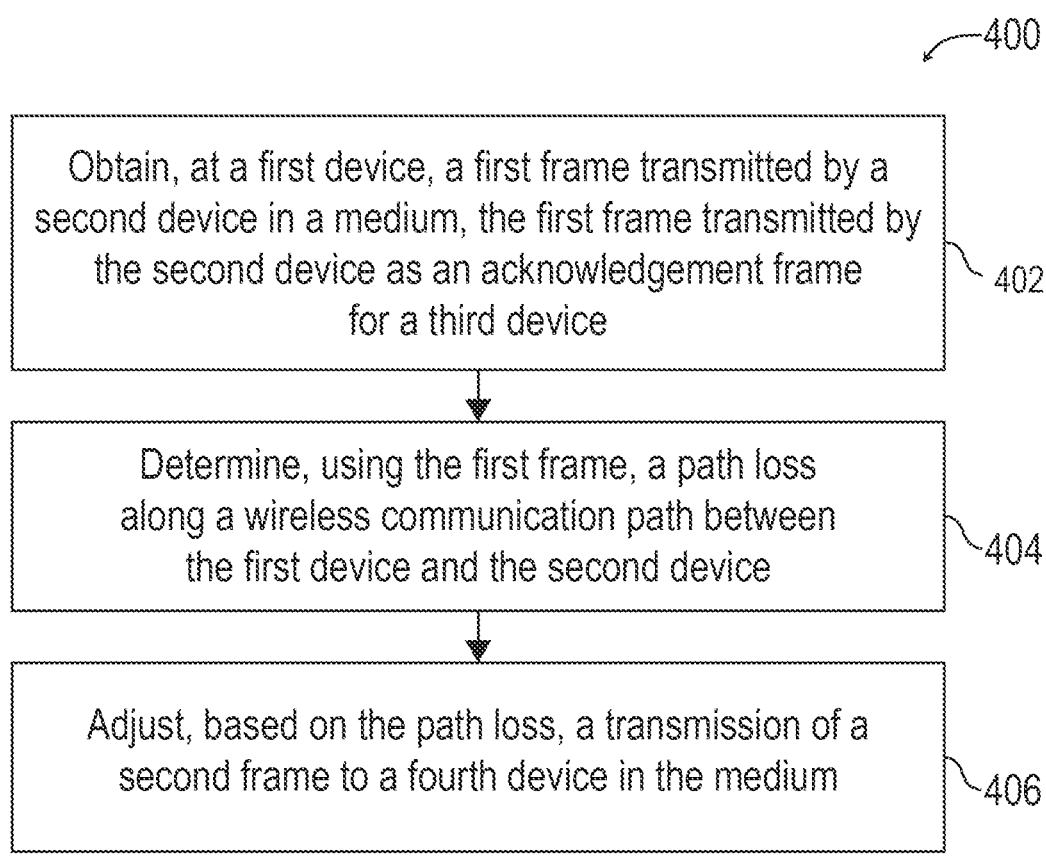
FIG. 4 illustrates a flowchart of an example method of wireless communication.

FIG. 4 illustrates a flowchart of an example method 400 of wireless communication, in accordance with one or more implementations of the present disclosure. The method 400 may be implemented, in whole or in part, by one or more of the devices of FIG. 1, 2, or 3.

At block 402, a first frame transmitted by a second device in a medium may be obtained by a first device. The first frame may be transmitted by the second device as a response frame for a third device in response to a management frame transmitted by the third device to the second device.

At block 404, a path loss along a wireless communication path between the first device and the second device may be determined using the first frame.

At block 406, a transmission of a second frame to a fourth device in the medium may be adjusted based on the path loss. In some implementations, the first device and the fourth device may be part of a first wireless network. In these and other implementations, the second device and the third device may be part of a second wireless network that is different from the first wireless network.

In some implementations, adjusting the transmission of the second frame may include delaying transmission of the second frame. Alternately or additionally, adjusting the transmission of the second frame may include adjusting a power of transmission of the second frame. Alternately or additionally, adjusting the transmission of the second frame may include adjusting a frequency segment of the medium used for transmission of the second frame.

One skilled in the art will appreciate that, for this and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

For example, in some implementations, the method 400 may further include determining potential interference at the second device from the transmission of the second frame to the fourth device based on the path loss between the first device and the second device. In these and other implementations, the power of the transmission of the second frame may be adjusted based on the potential interference.

In some implementations, the method 400 may further include before obtaining the first frame, obtaining, at the first device, a third frame from the third device. The third frame may request a response from the second device. In these and other implementations, the frequency segment of the medium used for transmission of the second frame may be adjusted based on data in the third frame.

In some implementations, the method 400 may further include before obtaining the first frame, monitoring the medium for frames in response to preparing to transmit the second frame to the fourth device. In these and other implementations, the first frame may be obtained during the monitoring of the medium for frames.

In some implementations, the method 400 may further include after transmitting the second frame, monitoring the medium for frames in response to preparing to transmit a third frame to a fifth device. In these and other implementations, while monitoring the medium for frames, the method 400 may further include obtaining, at the first device, a fourth frame from a sixth device, the fourth frame requesting a response from a seventh device and in response to not obtaining a frame from the seventh device acknowledging the fourth frame, transmitting the third frame to the fifth device. In these and other implementations, one or more of: the fourth device and the fifth device may be the same devices, the second device and the seventh device may be the same device, and the third device and the sixth device may be the same device.

In some implementations, the method 400 may further include after transmitting the second frame, obtaining, at the first device, a third frame requesting a response from the second device and in response to not obtaining a frame from the second device acknowledging the third frame, transmitting a fourth frame to the fourth device.

In some implementations, the method 400 may further include after transmitting the second frame, obtaining, at the first device, a third frame transmitted by a fifth device and determining, using the third frame, a second path loss along a second wireless communication path between the first device and the fifth device. The method 400 may further include based on the second path loss, transmitting a fourth frame to a sixth device in the medium without adjustment. In these and other implementations, one or more of: the second device and the fifth device may be the same devices and the fourth device and the sixth device may be the same device.

Figure 5:
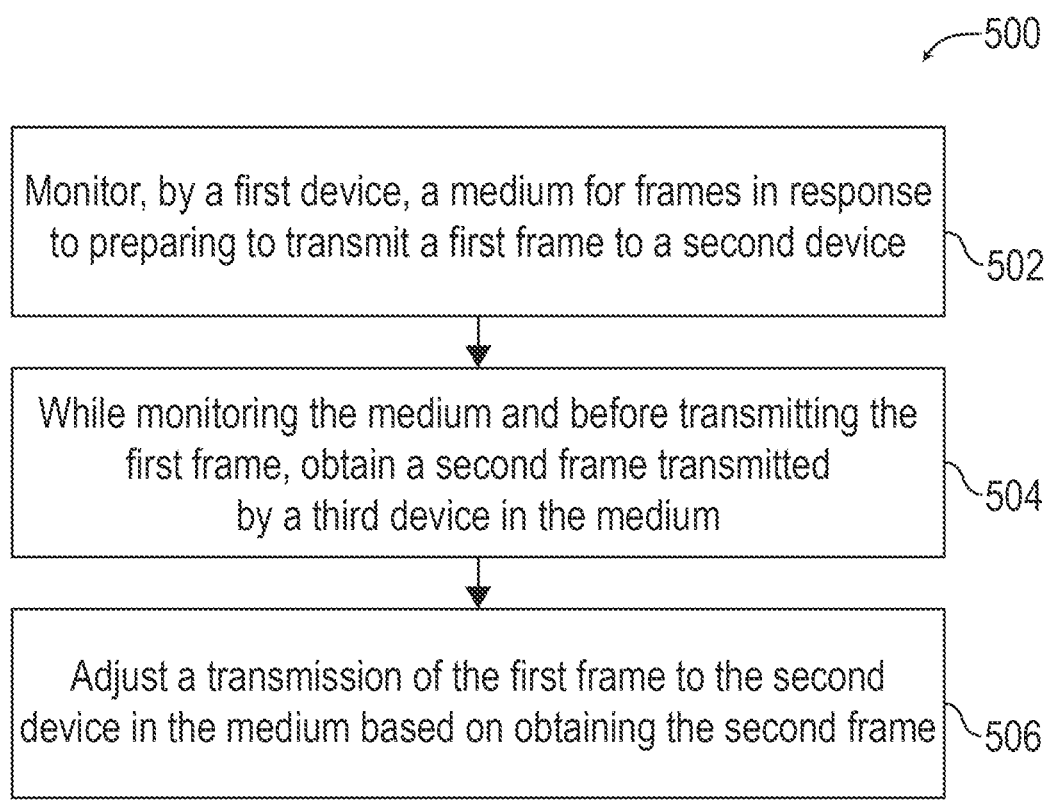
FIG. 5 illustrates a flowchart of another example method of wireless communication.

FIG. 5 illustrates a flowchart of an example method 500 of wireless communication, in accordance with one or more implementations of the present disclosure. The method 500 may be implemented, in whole or in part, by one or more of the devices of FIG. 1, 2, or 3.

At block 502, a medium may be monitored by a first device for frames in response to preparing to transmit a first frame to a second device.

At block 504, while monitoring the medium and before transmitting the first frame, a second frame transmitted by a third device in the medium may be obtained.

At block 506, a transmission of the first frame to the second device in the medium may be adjusted based on obtaining the second frame. In some implementations, adjusting the transmission of the first frame may include one or more of: delaying transmission of the first frame, adjusting a power of transmission of the first frame, and adjusting a frequency segment of the medium used for transmission of the first frame.

In some implementations, the method 500 may further include determining, using the second frame, a path loss along a wireless communication path between the first device and the third device.

In some implementations, the method 500 may further include after transmitting the second frame, monitoring the medium for frames in response to preparing to transmit a third frame to a fourth device and while monitoring the medium for frames, obtaining, at the first device, a fourth frame from a fifth device, the fourth frame requesting a response from a sixth device. The method 500 may further include in response to not obtaining a frame from the sixth device acknowledging the fourth frame, transmitting the third frame to the fourth device.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1 may include a method of wireless communication that includes obtaining, at a first device, a first frame transmitted by a second device in a medium. In some implementations, the first frame may be transmitted by the second device as a response frame for a third device. The method may also include determining, using the first frame, a path loss along a wireless communication path between the first device and the second device and adjusting, based on the path loss, a transmission of a second frame from the first device to a fourth device in the medium.

Example 2 may include a device that includes hardware configured to obtain a first frame transmitted by a first device over a medium. In some implementations, the first frame may be transmitted by the first device as a response frame for a second device. The device may also include a processor configured to perform operations. The operations may include determine using the first frame, a path loss along a wireless communication path between the device and the first device and adjust, based on the path loss, parameters for transmission of a second frame to a third device in the medium.

Example 3 may include a method of wireless communication that includes monitoring, by a first device, a medium for frames in response to preparing to transmit a first frame to a second device. The method may also include while monitoring the medium and before transmitting the first frame, obtaining a second frame transmitted by a third device in the medium and adjusting a transmission of the first frame to the second device in the medium based on obtaining the second frame.

Example 4 may include hardware configured to reduce potential interference by adjusting a transmission protocol in view of an expected impact to an intended receiver of a transmission. To reduce potential interference, the hardware may be further configured to intercept a frame over a communication medium, the intended receiver being associated with the frame, and where the potential interference is determined in view of the frame being sent to the intended receiver. To reduce potential interference, the hardware may be configured to listen for a response frame and, responsive to not identifying the response frame within a threshold amount of time, send a transmit frame to a particular device. The adjustment to the transmission protocol may be for a particular transmission for one or more devices other than the intended receiver. The expected impact to the intended receiver may include a calculated path loss between a transmit device and the intended receiver of the transmission.

FIG. 7 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as N×N discrete communication streams over N antennas. In an example the MIMO apparatus signal processing units can be implemented as N×N. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present disclosure.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of wireless communication, the method comprising:
obtaining, at a first device, a first frame transmitted by a second device in a medium, the first frame designating a third device as a receiving device and being transmitted by the second device to the third device in response to a frame directed to the second device from the third device;
determining, using the first frame by the first device, a path loss along a wireless communication path between the first device and the second device; and
adjusting, based on the path loss, a transmission of a second frame from the first device to a fourth device in the medium.

2. The method of claim 1, wherein the first device and the fourth device are part of a first wireless network; and the second device and the third device are part of a second wireless network that is different from the first wireless network.

3. The method of claim 1, wherein adjusting the transmission of the second frame includes delaying transmission of the second frame.

4. The method of claim 1, wherein adjusting the transmission of the second frame includes adjusting a power of transmission of the second frame.

5. The method of claim 4, further comprising determining potential interference at the second device from the transmission of the second frame to the fourth device based on the path loss, wherein the power of the transmission of the second frame is adjusted based on the potential interference.

6. The method of claim 1, wherein adjusting the transmission of the second frame includes adjusting a frequency segment of the medium used for transmission of the second frame.

7. The method of claim 6, further comprising before obtaining the first frame, obtaining, at the first device, a third frame from the third device, the third frame requesting a response from the second device, wherein the frequency segment of the medium used for transmission of the second frame is adjusted based on data in the third frame.

8. The method of claim 1, further comprising before obtaining the first frame, monitoring the medium for frames in response to preparing to transmit the second frame to the fourth device, wherein the first frame is obtained during the monitoring of the medium for frames.

9. The method of claim 1, further comprising:
after transmitting the second frame, monitoring the medium for frames in response to preparing to transmit a third frame to a fifth device;
while monitoring the medium for frames, obtaining, at the first device, a fourth frame from a sixth device, the fourth frame requesting a response from a seventh device; and
in response to not obtaining a frame from the seventh device acknowledging the fourth frame, transmitting the third frame to the fifth device.

10. The method of claim 9, wherein one or more of: the fourth device and the fifth device are the same device, the second device and the seventh device are the same device, and the third device and the sixth device are the same device.

11. The method of claim 1, further comprising:
transmitting the second frame to the fourth device with the adjustment;
after transmitting the second frame, obtaining, at the first device, a third frame that requests that the second device transmit a response; and
in response to not obtaining a frame from the second device acknowledging the third frame, transmitting a fourth frame to the fourth device.

12. The method of claim 1, further comprising:
after transmitting the second frame, obtaining, at the first device, a third frame transmitted by a fifth device;
determining, using the third frame, a second path loss along a second wireless communication path between the first device and the fifth device; and
based on the second path loss, transmitting a fourth frame to a sixth device in the medium without adjustment.

13. The method of claim 12, wherein one or more of: the second device and the fifth device are the same device and the fourth device and the sixth device are the same device.

14. A device comprising:
hardware configured to obtain a first frame transmitted by a second device over a medium, the first frame designating a third device as a receiving device and being transmitted by the second device to the third device in response to a frame directed to the second device from the third device; and
a processor configured to perform operations including:
determine using the first frame, a path loss along a wireless communication path between the device and the second device; and
adjust, based on the path loss, parameters for transmission of a second frame to a fourth device in the medium.

15. The device of claim 14, wherein adjusting the parameters for transmission of the second frame includes one or more of: adjusting a time for transmission of the second frame, adjusting a power of transmission of the second frame, and adjusting a frequency segment of the medium used for transmission of the second frame.

16. The device of claim 14, wherein the processor is further configured to determine potential interference at the second device from transmission of the second frame to the fourth device based on the path loss, wherein a power of transmission of the second frame is adjusted based on the potential interference.

17. The device of claim 14, wherein the hardware is further configured to before obtaining the first frame, obtain a third frame from the third device, the third frame requesting a response from the second device, wherein the parameters for transmission of the second frame adjusted by the processor is a frequency segment of the medium used for transmission of the second frame and the frequency segment is adjusted based on data in the third frame.

18. A method of wireless communication, the method comprising:
monitoring, by a first device, a medium for frames in response to preparing to transmit a second frame to a fourth device;
while monitoring the medium and before transmitting the second frame, obtaining a first frame transmitted by a second device in the medium, the second device transmitting the first frame to a third device and the first frame designating the third device as a recipient device; and adjusting a transmission of the second frame to the fourth device in the medium based on information in the first frame.

19. The method of claim 18, wherein adjusting the transmission of the second frame includes one or more of: delaying transmission of the second frame, adjusting a power of transmission of the second frame, and adjusting a frequency segment of the medium used for transmission of the second frame.

20. The method of claim 18, further comprising determining, using the information in the first frame, a path loss along a wireless communication path between the first device and the second device, wherein the transmission of the second frame is adjusted based on the path loss.

21. The method of claim 18, further comprising:
after transmitting the first frame, monitoring the medium for frames in response to preparing to transmit a third frame to a fifth device;
while monitoring the medium for frames, obtaining, at the first device, a fourth frame from a sixth device, the fourth frame requesting a response from a seventh device; and
in response to not obtaining a frame from the seventh device acknowledging the fourth frame, transmitting the third frame to the fifth device.

22. The method of claim 18, further comprising:
after transmitting the second frame, obtaining, at the first device, a third frame transmitted by a fifth device;
determining, using the third frame, a path loss along a wireless communication path between the first device and the fifth device; and
based on the path loss, transmitting a fourth frame to a sixth device in the medium without adjustment.

23. A device comprising:
hardware configured to intercept a first frame transmitted by a second device over a communication medium, the first frame intended for and directed to a third device; and
a processor configured to perform operations including:
determine, using the first frame, an expected impact to the second device due to transmission, in the communication medium by the device, of a second frame to a fourth device, the expected impact determined based on a path loss between the device and the second device; and
adjust, based on the determined expected impact, parameters for transmission of the second frame to the fourth device in the communication medium.

24. The device of claim 23, wherein the expected impact to the third device is determined based on a calculated path loss between the device and the second device.

25. The device of claim 23, wherein the adjustment to the parameters for transmission includes one or more of: delaying transmission of the second frame, adjust a power of transmission of the second frame, and adjusting a frequency segment for transmission of the second frame.

* * * * *